US011399298B1

(12) United States Patent
Borges et al.

(10) Patent No.: US 11,399,298 B1
(45) Date of Patent: Jul. 26, 2022

(54) SYSTEMS AND METHODS FOR DETECTING A MOST IMPACTED BASE STATION SECTOR BY AN EXTERNAL INTERFERENCE SOURCE

(71) Applicant: Verizon Patent and Licensing Inc., Basking Ridge, NJ (US)

(72) Inventors: Ricardo Francisco Borges, Noblesville, IN (US); Sudha Subramaniam, Westborough, MA (US); Matthew Kapala, North Billerica, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/200,125

(22) Filed: Mar. 12, 2021

(51) Int. Cl.
*H04W 24/08* (2009.01)
*H04B 17/345* (2015.01)
*H04W 24/02* (2009.01)

(52) U.S. Cl.
CPC .......... *H04W 24/08* (2013.01); *H04B 17/345* (2015.01); *H04W 24/02* (2013.01)

(58) Field of Classification Search
CPC ........... H04W 28/0236; H04W 72/082; H04W 24/08
See application file for complete search history.

(56) References Cited

U.S. PATENT DOCUMENTS

| 10,187,098 | B1* | 1/2019 | Tsui | H04B 1/0466 |
| 2014/0378067 | A1* | 12/2014 | Au | H04B 17/0085 |
| | | | | 455/67.11 |
| 2015/0350940 | A1* | 12/2015 | Wilson | H04B 1/1027 |
| | | | | 370/252 |
| 2018/0323815 | A1* | 11/2018 | Beadles | H04B 1/123 |
| 2019/0052294 | A1* | 2/2019 | Abdelmonem | H04B 17/336 |
| 2021/0127284 | A1* | 4/2021 | Abdelmonem | H04L 27/0008 |

FOREIGN PATENT DOCUMENTS

| WO | WO-2017072552 A1 * | 5/2017 | ........... H04B 1/1027 |
| WO | WO-2019203704 A1 * | 10/2019 | ............. H04B 1/525 |

* cited by examiner

*Primary Examiner* — Kevin Kim

(57) ABSTRACT

A device may receive interference data identifying interference associated with sectors provided by base stations, and may filter interference data associated with sectors with passive intermodulation issues and sectors with alarms related to sectors' radio, from the interference data, to generate interference data for a set of sectors. The device may perform an interference analysis on the sectors' physical resource blocks (PRBs) and receiving branches, of the interference data, to generate analysis results, and may determine interference associated with co-located sectors of the set of sectors. The device may identify neighbor sectors based on the interference, and may compare PRBs of the set of sectors with PRBs of the neighbor sectors to generate comparison results. The device may identify a particular sector that is the most impacted sector when compared to its neighboring and co-located sectors, associated with an interference source, based on the comparison results.

20 Claims, 10 Drawing Sheets

100 ⟶

SYSTEMS AND METHODS FOR DETECTING A MOST IMPACTED BASE STATION SECTOR BY AN EXTERNAL INTERFERENCE SOURCE

BACKGROUND

A base station (e.g., an eNodeB, a gNodeB, and/or the like) is a hardware component that connects a core network to an end user mobile device (e.g., a user equipment or UE). A base station sends and receives wireless radio transmissions to and from UEs, and controls low-level operation of UEs connected to the base station via a radio access network (RAN).

DETAILED DESCRIPTION OF PREFERRED EMBODIMENTS

Figure 1A:
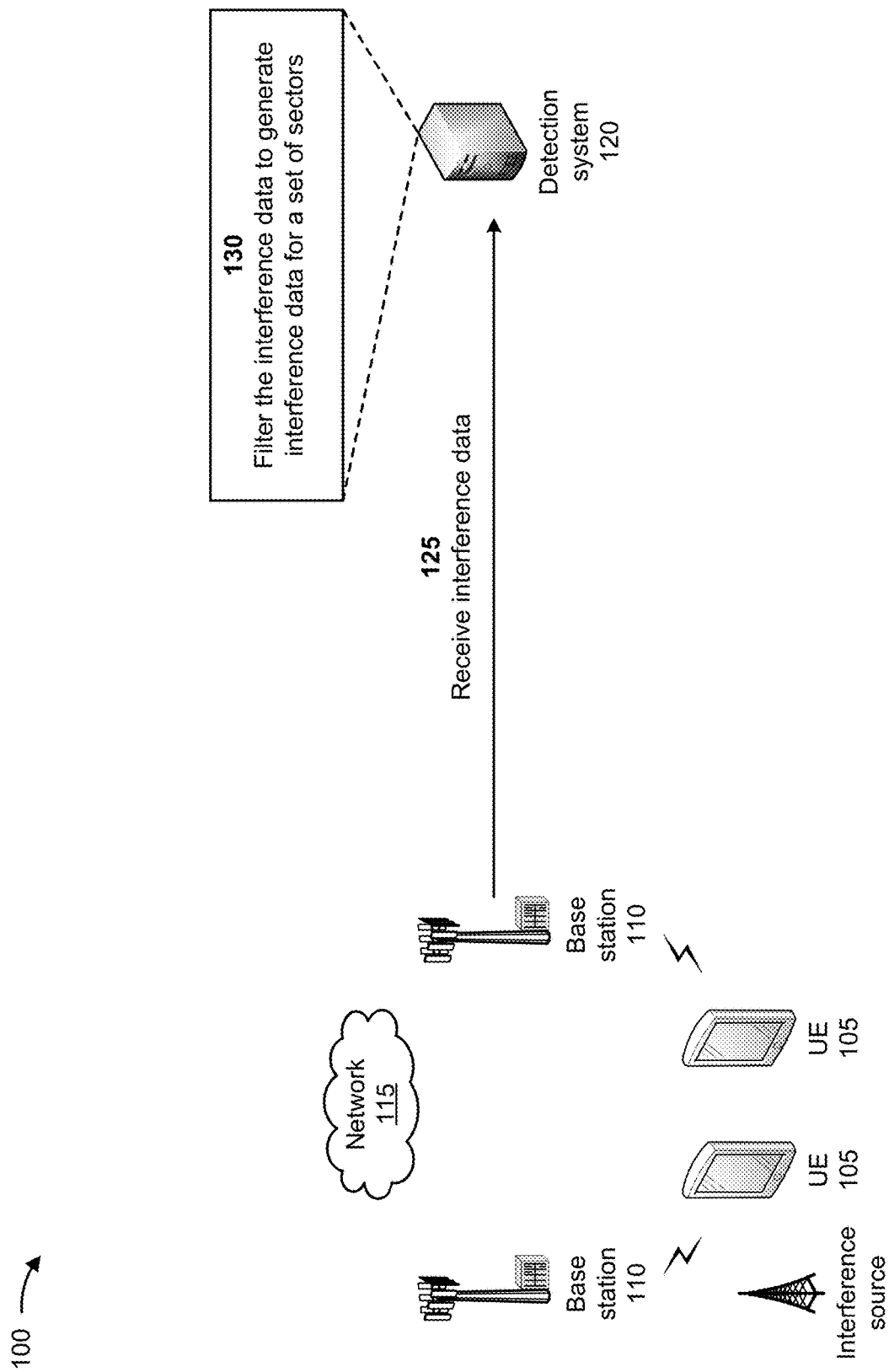
FIGS. 1A-1G are diagrams of an example associated with detecting an impacted base station sector by an external interference source.

The following detailed description of example implementations refers to the accompanying drawings. The same reference numbers in different drawings may identify the same or similar elements.

Radio frequency (RF) interference of a base station may be caused by an electronic device (e.g., an interference source) that radiates RF signals in the same frequency RF channels of the base station, without utilizing the RF signals to establish communication with the base station. Thus, the RF signals create noise and interfere with operation of the base station. In such situations, an entity associated with the base station must quickly determine a location of the interference source so that the interference source may be disabled and performance degradation of the base station may be avoided.

Current techniques for locating the interference source include the time-consuming process of technicians driving around and attempting to locate the interference source with RF signal sensors. Thus, current techniques for locating the interference source waste computing resources (e.g., processing resources, memory resources, communication resources, and/or the like), networking resources, transportation resources, and/or the like associated with driving around to locate the interference source, degraded base station performance caused by the interference source, handling customer complaints associated with the degraded base station performance, and/or the like.

Some implementations described herein provide a detection system that detects a base station sector that is impacted by an external interference source. For example, the detection system may receive interference data identifying interference associated with sectors provided by base stations. The detection system may filter interference data associated with sectors experiencing interference caused by a reason other than an external interference source. For example, the detection system may filter interference data associated with a passive intermodulation (PIM) issue and/or a defective sector-radio, from the interference data, to generate interference data for a set of sectors experiencing interference caused by an external interference source. The detection system may perform an interference analysis on physical resource blocks (PRBs) on each sector and/or on each sector's receiving RF branches of a given frequency channel, of the interference data for the set of sectors, to generate analysis results. The detection system may determine, based on the analysis results, interference associated with co-located sectors and neighbor sectors of the set of sectors with interference. The detection system may compare PRBs of the set of sector with PRBs of the co-located sectors and PRBs of the neighbor sectors to generate comparison results. The detection system may identify a particular sector, associated with a particular base station and an interference source, based on the comparison results and may enable one or more actions to be performed to mitigate an effect of the interference source on the base station based on identifying the particular sector.

In this way, the detection system detects a base station sector impacted by an external interference source. The detection system may identify sectors of base stations that are experiencing external interference and may differentiate the external interference from other types of interference, such as passive intermodulation. Additionally, the detection system may automatically isolate the most impacted sectors of base stations affected by the external interference. The detection system expedites the detection of external interference thereby increasing a quantity of resolved cases, improving general network performance, and improving customer experience. Thus, the detection system makes the process of detecting external interference sources faster and more efficient relative to convention methods. In this way, the detection system conserves computing resources, networking resources, transportation resources, and/or the like associated with driving around to locate the interference source, degraded base station performance caused by the interference source, handling customer complaints associated with the degraded base station performance, and/or the like. Further, the detection system conserves computing resources by reducing redundant computing devices and operations, such as would occur with multiple vehicles traveling within an area and utilizing portable detectors to locate an interference source.

FIGS. 1A-1G are diagrams of an example 100 associated with detecting an impacted base station sector by an external interference source. As shown in FIGS. 1A-1G, example 100 includes user equipment (UEs) 105 associated with base stations 110, a network 115, and a detection system 120. Each of UEs 105 may include a wireless communication device, a mobile phone, a laptop computer, a tablet computer, a desktop computer, and/or the like. Each base station 110 may include an eNodeB (eNB), a gNodeB (gNB), and/or the like that provides cellular communications. Network 115 may include a RAN associated with a long-term evolution (LTE) or fourth generation (4G) network, a new radio (NR) or fifth generation (5G) network, and/or the like. Detection system 120 may include a system that detects a base station sector impacted by an external interference source, as described herein.

As shown in FIG. 1A, and by reference number 125, the detection system 120 receives interference data from one or more base stations 110 associated with network 115. A base station 110, of the one or more base stations 110 associated with the network 115, may be associated with multiple sectors corresponding to respective antennas of the base station 110 facing in respective directions. Each sector may have one or more carriers (e.g., RF channels) for wireless communication with the UEs 105. The interference data may include information identifying interference associated with one or more of the sectors associated with the base station 110. For example, the interference data may include sector RF receiver (RX) branch and PRB data per sector or per sector RX branches, cell relation with handover attempts data, geographical data for locations of the base stations 110, information identifying logical configurations of the base stations 110, information identifying physical configurations of the base stations 110, data indicating an interference level associated with a PRB (e.g., signal level strength (in Watts, milliwatts, decibels, and/or decibel meters) above a threshold), data indicating interference associated with a UE (e.g., data indicating a signal-to-noise ratio associated with a UE), and/or the like.

As shown by reference number 130, the detection system 120 filters the interference data to generate interference data for a set of sectors. Initially, the detection system 120 may filter the interference data to remove interference data associated with sectors that are not experiencing at least a minimum level of interference. The detection system 120 may identify a group of sectors associated with at least the minimum level of interference based on an interference level key performance indicator (KPI) associated with the base stations 110 and/or the network 115. For example, the detection system 120 may filter the interference data to remove interference data associated with sectors having a received signal level above a signal level threshold (e.g., −110 dBm).

In some implementations, the detection system 120 removes interference data associated with sectors associated with passive intermodulation issues from the interference data received by the base station 110. The detection system 120 may calculate a difference between an interference level during first traffic conditions and an interference level during second traffic conditions based on the interference data associated with a particular sector. The detection system 120 may determine whether the difference between the interference level during the first traffic conditions and the interference level during the second traffic conditions satisfies one or more interference level criteria (e.g., satisfies a threshold, fails to satisfy a threshold, falls within a particular range of values, and/or the like). The detection system 120 may determine that the particular sector is associated with passive intermodulation issues when the difference satisfies the one or more criteria. The detection system 120 may generate the interference data for the set of sectors by removing interference data associated with the particular sector from the interference data based on the particular sector being associated with the passive intermodulation issues.

In some implementations, the detection system 120 detects sectors associated with passive intermodulation issues based on interference data associated with receiving branches for a sector and removes the interference data associated with the receiving branches for the sector from the interference data. The detection system 120 may identify a sector that has multiple receiving branches. The detection system 120 may determine whether all of the multiple receiving branches are experiencing a threshold level of interference. The detection system 120 may determine that the interference experienced by the sector is associated with an internal issue (e.g., passive intermodulation) when all of the multiple receiving branches are not experiencing the threshold level of interference. The detection system 120 may remove interference data associated with the sector from the interference data based on the interference experienced by the sector being associated with the internal issue rather than an interference source. Alternatively, and/or additionally, the detection system 120 may determine that interference experienced by the sector is associated with an interference source (e.g., an unauthorized transmitter) when all of the multiple receiving branches are experiencing the threshold level of interference.

Alternatively, and/or additionally, the detection system 120 may remove interference data associated with sectors associated with radio alarms from the interference data for the set of sectors. The detection system 120 may determine that a base station 110 is associated with a radio alarm related to an issue with equipment (e.g., an alert triggered in response to an occurrence of an event such as an error, an equipment failure, and/or the like) based on information received from the base station 110. For example, the detection system 120 may determine that the base station 110 is associated with a radio alarm related to an issue with equipment based on control information, a radio alarm identifier, and/or the like transmitted by the base station 110 and received by the detection system 120. The detection system 120 may determine that interference associated with one or more sectors of the base station 110 is caused by an issue with equipment (e.g., a failure of a physical component, a software error, and/or the like) associated with the base station 110 based on the base station 110 being associated with the radio alarm related to an issue with equipment. In some implementations, the detection system 120 determines that the interference data associated with the one or more sectors satisfies one or more criteria associated with radio alarms related to issues with equipment. For example, the detection system 120 may determine that the interference data associated with the one or more sectors are associated with a faulty or defective radio. The detection system 120 may generate the interference data for the set of sectors by removing the interference data associated with the one or more sectors from the interference data.

Figure 1B:
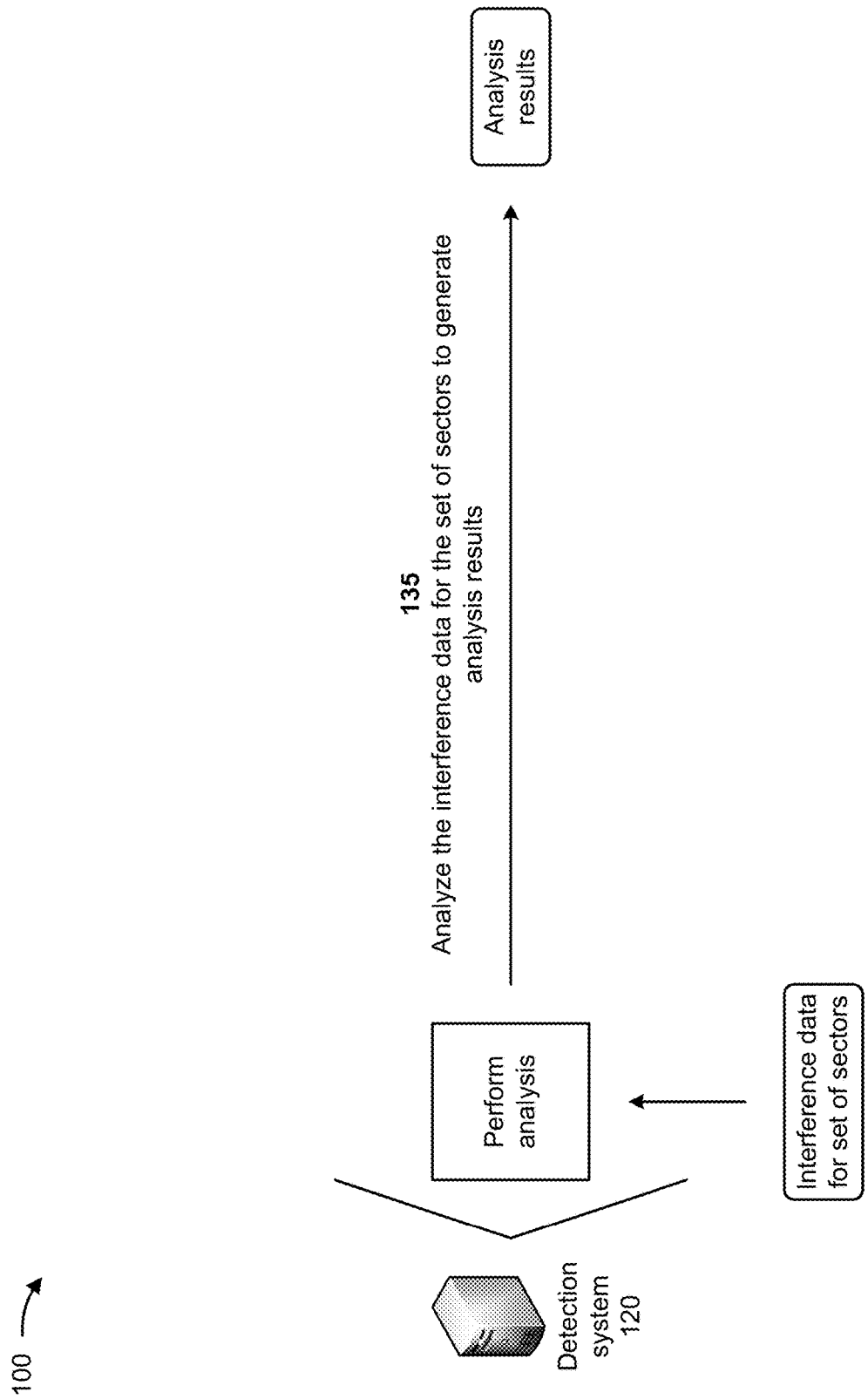

As shown in FIG. 1B, and by reference number 135, the detection system 120 analyzes the interference data for the set of sectors to generate analysis results. In some implementations, the detection system 120 generates the analysis results based on performing an interference analysis on interference data associated with each PRB. The detection system 120 may perform the analysis on each PRB to identify a set of PRBs associated with at least a threshold amount of interference based on an interference level and occurrences of each PRB, as described in greater detail below.

In some implementations, the interference analysis performed on interference data associated with a PRB includes determining a maximum interference level associated with the PRB and determining whether the maximum interference level associated with the PRB satisfies one or more criteria associated with a PRB interference level. For example, the detection system 120 may determine a maximum interference level associated with the PRB based on the interference data associated with the PRB. The detection system 120 may determine whether the maximum interference level associated with the PRB satisfies a threshold (e.g., >−108 dBm). In some implementations, the detection system 120 stores information identifying the maximum interference level associated with the PRB and/or information indicating whether the maximum interference level associated with the PRB satisfies the one or more criteria associated with the PRB interference level in a data structure (e.g., a database, a table, a list, and/or the like). Alternatively, and/or additionally, the detection system 120 may remove the interference data associated with the PRB from the interference data when the maximum interference level associated with the PRB satisfies the one or more criteria associated with the PRB interference level.

In some implementations, the interference analysis performed on the data associated with the PRB includes calculating an average interference level associated with the PRB based on the interference data and determining whether the average interference level associated with the PRB satisfies one or more criteria associated with average interference levels. In some implementations, the interference data may be expressed in decibel-milliwatts (dBm). The detection system 120 may convert the interference data from decibel-milliwatts to milliwatts (mW). For example, the detection system 120 may convert the interference data from decibel-milliwatts to milliwatts based on the formula:

$$P_{(mW)} = 1_{mW} \times 10^{P_{(dBm)}/10}$$

The detection system 120 may calculate the average interference level for the PRB in milliwatts based on converting the interference data from decibel-milliwatts to milliwatts. The detection system 120 may convert the calculated average interference levels from milliwatts to decibel-milliwatts based on the formula:

$$P_{(dBm)} = 10 \times \log_{10}\left(\frac{P_{(mW)}}{1_{mW}}\right)$$

The detection system 120 may determine whether the average interference level determined for the PRB satisfies one or more criteria associated with average interference levels. For example, the detection system 120 may determine whether the average interference level satisfies an interference threshold (e.g., whether the average interference level is greater than −110 dBm). In some implementations, the detection system 120 stores information identifying the average interference level associated with the PRB and/or information indicating whether the average interference level associated with the PRB satisfies the one or more criteria associated with average interference levels in a data structure. Alternatively, and/or additionally, the detection system 120 may remove the interference data associated with the PRB from the interference data when the average interference level satisfies the one or more criteria associated with average interference levels.

In some implementations, the interference analysis performed on the data associated with the PRB includes calculating an average interference level associated with interference levels greater than a threshold (e.g., −110 dBm) based on the interference data. For example, the detection system 120 may identify interference data that is associated with the PRB and indicate an interference level greater than a threshold. The detection system 120 may determine a set of interference levels associated with the PRB based on the identified interference data. The detection system 120 may determine an average interference level associated with interference levels greater than the threshold based on the set of interference levels. The detection system 120 may store information identifying the average interference level associated with interference levels greater than the threshold in a data structure.

In some implementations, the interference analysis includes determining a quantity of instances when the interference level for the PRB exceeds an interference threshold (e.g., −110 dBm) based on the interference data. The detection system 120 may determine whether the quantity of instances when the interference level for the PRB exceeds the interference threshold satisfies a threshold quantity (e.g., 3) of instances. The detection system 120 may store information identifying the quantity of instances when the interference level for the PRB exceeds the interference threshold and/or information indicating whether the quantity of instances satisfies the threshold quantity of instances in a data structure.

In some implementations, the analysis results associated with the PRB include the maximum interference level, information indicating whether the maximum interference level associated with the PRB satisfies the one or more criteria associated with the PRB interference level, the average interference level, information indicating whether the average interference level satisfies the one or more criteria associated with average interference levels, the average interference level associated with interference levels greater than the threshold, the quantity of instances, and/or information indicating whether the quantity of instances satisfies the threshold quantity of instances. The detection system 120 may perform an interference analysis and/or may determine analysis results for each PRB in a manner similar to that described above.

Figure 1C:
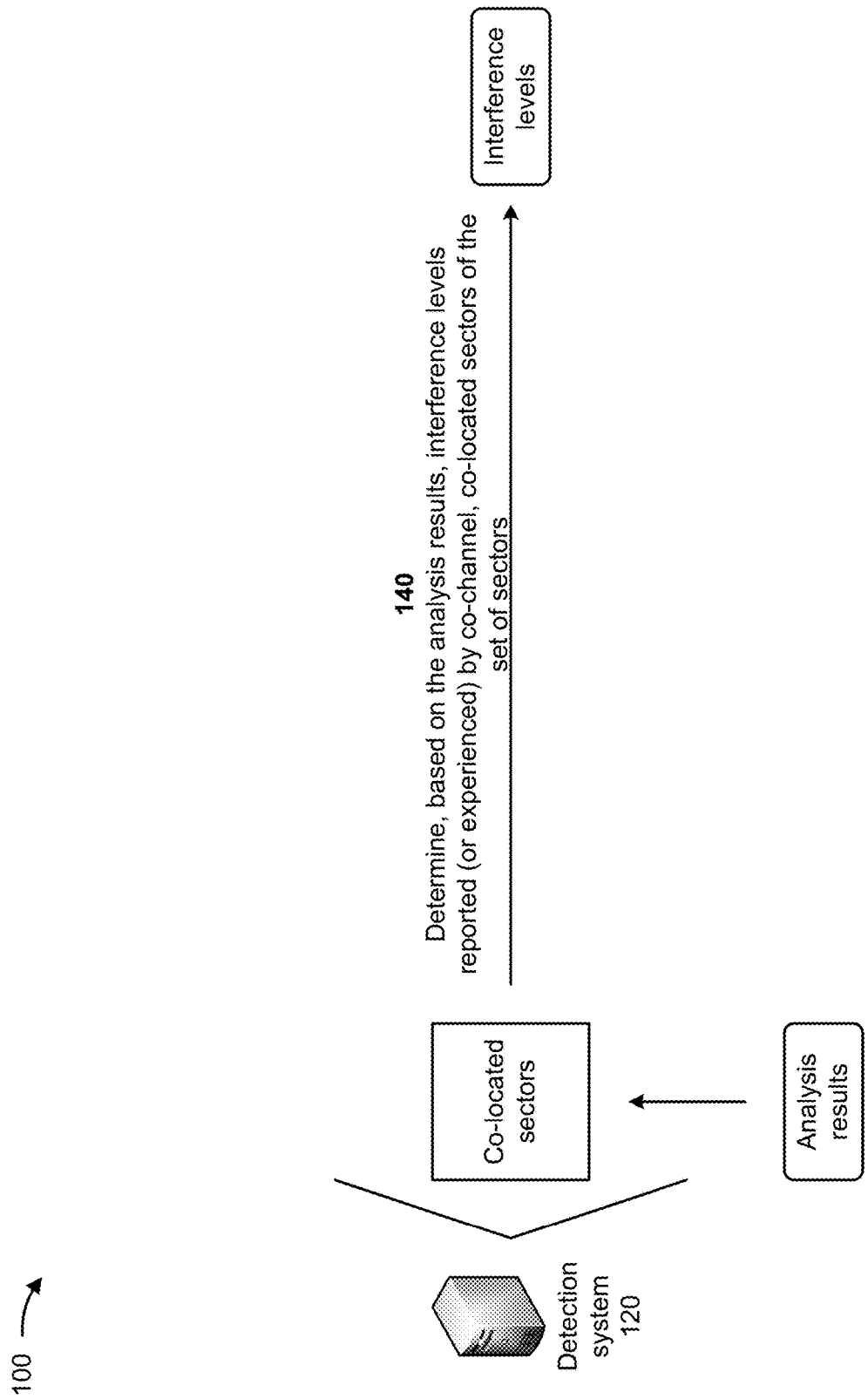

As shown in FIG. 1C, and by reference number 140, the detection system 120 determines, based on the analysis results, interference levels reported (or experienced) by co-channel, co-located sectors of the set of sectors. The interference may correspond to interference experienced by co-located sectors and caused by an interference source. The detection system 120 may identify a set of co-located sectors, of the set of sectors, associated with a base station 110. For example, the detection system 120 may obtain information associated with sectors of the base station 110 from a data structure and/or from the base station 110. The detection system 120 may identify the set of co-located sectors based on the obtained information.

The detection system 120 may determine, on a same channel and for a same PRB, whether a respective interference level associated with each sector, of the co-located sectors, satisfies one or more criteria associated with interference associated with co-located sectors. For example, the detection system 120 may determine whether the respective interference level associated with each sector satisfies an interference threshold. The detection system 120 may determine that the interference experienced by the co-located sectors corresponds to interference when the respective interference levels associated with the co-located sectors satisfy the one or more criteria associated with interference associated with co-located sectors (e.g., the interference threshold). The detection system 120 may determine that there is at least a threshold probability that the interference is caused by an interference source based on the interference experienced by the co-located sectors corresponding to interference. In some implementations, the detection system 120 may remove interference data associated with the co-located sectors from the interference data when the respective interference levels associated with the co-located sectors fails to satisfy the one or more criteria associated with interference associated with co-located sectors.

In some implementations, the detection system determine that one or more co-channel and co-located sectors are experiencing interference. In these implementations, the detection system may determine that there is a higher probability that the interference is caused by an external interference source rather than being caused by an internal issue.

Figure 1D:
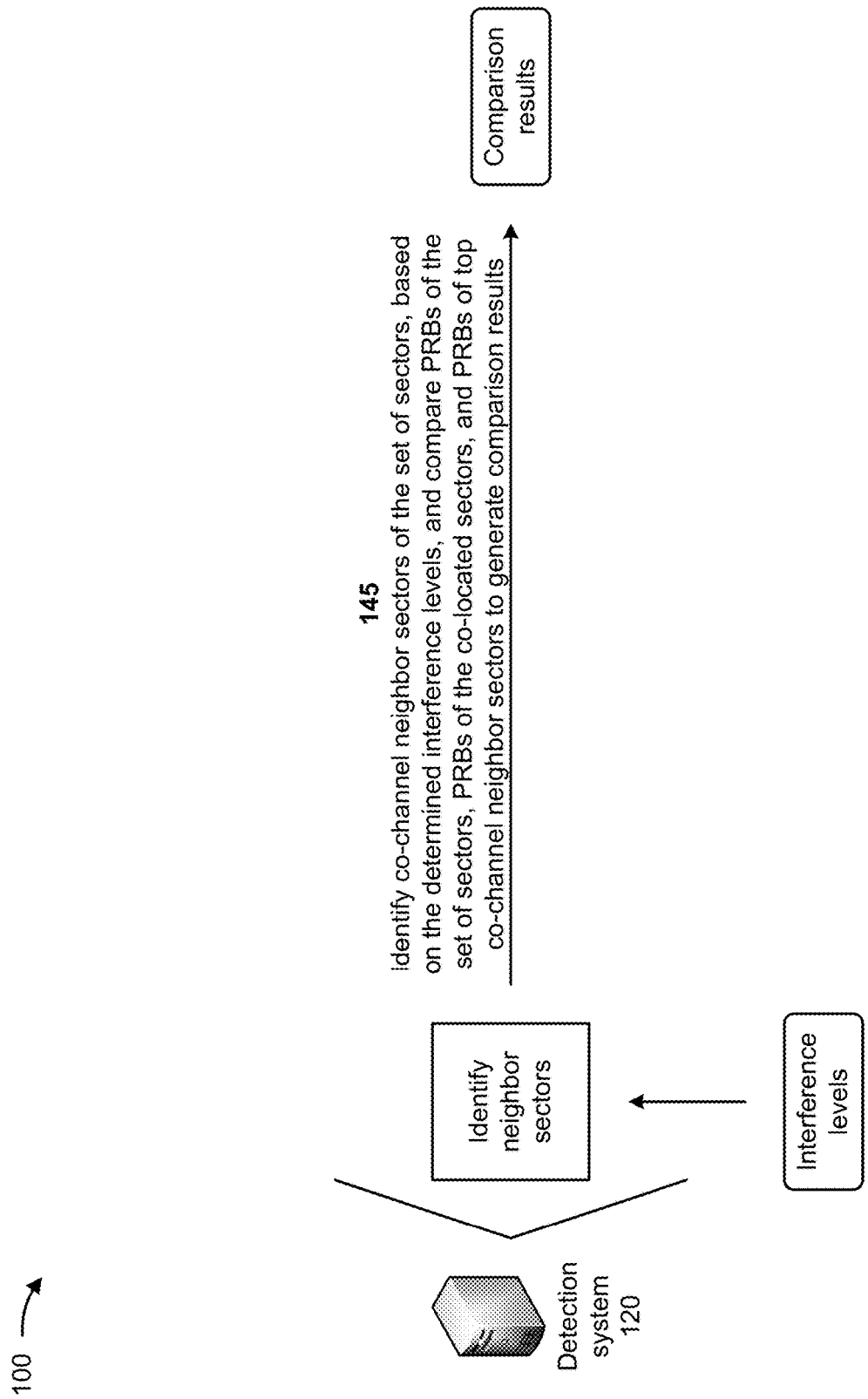

As shown in FIG. 1D, and by reference number 145, the detection system 120 identifies co-channel (e.g., same RF frequency channel) neighbor sectors, of the set of sectors, based on the distance, handover attempts, and path-loss among the sectors, and compares PRBs of the sectors with PRBs of the co-channel neighbor sectors to generate comparison results. The top co-channel neighbor sectors may be sectors with which the sectors being analyzed attempted the greatest quantity of handover procedures relative to other sectors and/or sectors that are closer to the sectors relative to other sectors and/or to the lower air propagation path loss between the set of sectors and each of their neighbors.

In some implementations, the detection system 120 determines a respective quantity of handover procedures the a sector, of the set of sectors associated with the interference data, attempted with each co-channel neighbor sector. For example, the detection system 120 may determine a quantity of intra-frequency handover procedures a first sector, of the set of sectors, attempted to perform with each co-channel neighbor sector. The detection system 120 may identify a first group of co-channel neighbor sectors associated with the greatest quantity of handover procedures relative to the other co-channel neighbor sectors.

In some implementations, the detection system 120 determines a respective inter-site distance between the set of sectors and each co-channel neighbor sector. For example, the detection system 120 may determine a geographical distance between the first sector, of the set of sectors, and each co-channel neighbor sector. The detection system 120 may identify a second group of co-channel neighbor sectors associated with the smallest respective inter-site distance from the first sector relative to the other co-channel neighbor sectors.

In some implementations, the detection system 120 determines a respective air propagation path loss (presented in decibels or dB) between the set of sectors and each of their neighbors. For example, the detection system 120 may determine the wireless propagation path loss for the frequency channel under analysis between the first sector, of the set of sectors, and each co-channel neighbor sector. The detection system 120 may identify a third group of co-channel neighbor sectors associated with the lowest respective wireless path loss from the first sector relative to the other co-channel neighbor sectors.

The detection system 120 may determine the top co-channel neighbor sectors based on the first group of co-channel neighbor sectors and/or the second group of co-channel neighbor sectors and/or the third group of co-channel neighbors. For example, the top co-channel neighbor sectors may include each co-channel neighbor sector included in at least one of the first group of co-channel neighbor sectors or the second group of co-channel neighbor sectors. Alternatively, and/or additionally, the top co-channel neighbor sectors may include each sector included in the first group of co-channel neighbor sectors and the second and third group of co-channel neighbor sectors.

The detection system 120 may compare PRBs of the set of sectors with PRBs of the co-located sectors and PRBs of the top co-channel neighbor sectors based on identifying the top co-channel neighbor sectors to identify a reference sector. The reference sector may be a sector included in the set of sectors, a co-located sector, or a co-channel neighbor sector experiencing the highest interference relative to the other neighbor sectors and co-located sectors. For example, the detection system 120 may compare, for a particular PRB, the maximum interference level associated with a first sector, of the set of sectors being analyzed, the maximum interference level associated with the first sector's co-located sectors with the maximum interference level associated with each of the top co-channel neighbor sectors, the average interference level associated with the co-located sectors with the average interference level associated with each of the top co-channel neighbor sectors, the average interference level associated with interference levels greater than the threshold associated with the co-located sectors and the average interference level associated with interference levels greater than the threshold associated with the top co-channel neighbor sectors, the quantity of instances when the interference level for the PRB exceeds the interference threshold associated with the co-located sectors and the quantity of instances when the interference level for the PRB exceeds the interference threshold associated with the top co-channel neighbor sectors, and/or the like.

Figure 1E:
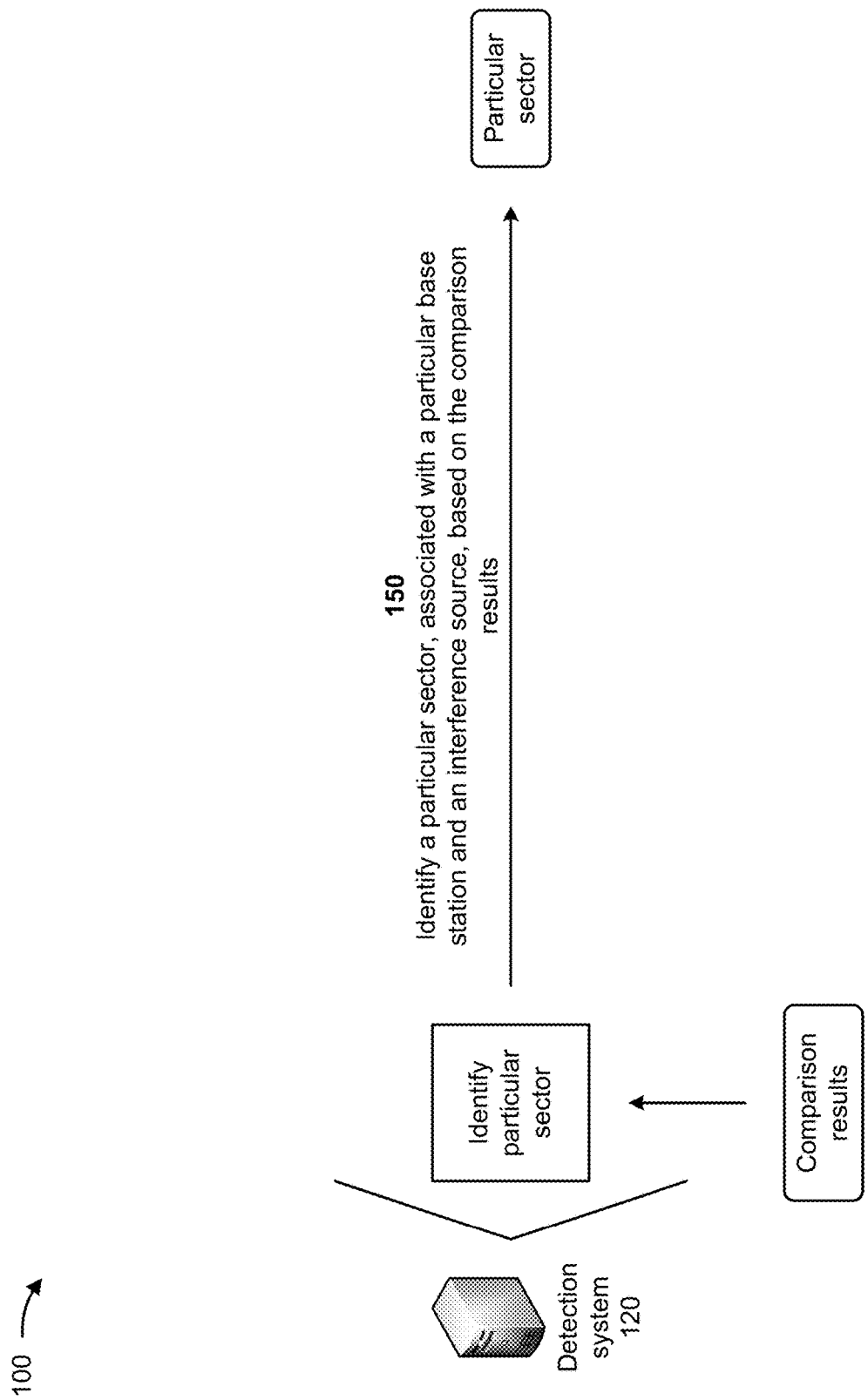

As shown in FIG. 1E, and by reference number 150, the detection system 120 identifies a particular sector, associated with a particular base station 110 and an interference source, based on the comparison results. The detection system 120 may identify the particular sector based on the particular sector experiencing a greatest level of external interference from the interference source relative to neighboring sectors of the particular sector. The detection system 120 may determine that the particular sector is experiencing the greatest level of external interference from the interference source relative to the neighboring sectors of the particular sector based on the particular sector satisfying one or more conditions.

In some implementations, the one or more conditions include a first condition, a second condition, a third condition, and a fourth condition. The first condition may require that, for a particular PRB, the maximum PRB interference level for the particular sector (e.g., the first sector, one of the co-located sectors, or one of the top co-channel neighbor sectors) is greater than a maximum PRB interference level for the neighboring sectors (e.g., the other ones of the co-located sectors and the top co-channel neighbor sectors). The second condition may require that, for the particular PRB, the average PRB interference level associated with the particular sector is greater than the average PRB interference level associated with the neighboring sectors. The third condition may require that, for the particular PRB, the average PRB interference level for PRB interference greater than a threshold associated with the particular sector is greater than the average PRB interference level for PRB interference greater than the threshold associated with the neighboring sectors. The fourth condition may require that, for the particular PRB, the quantity of instances that the interference level for the particular PRB is greater than a threshold for the particular sector is greater than the quantity of instances that the interference level for the particular exceeds the threshold for the neighboring sectors.

In some implementations, the detection system 120 determines that the particular sector is experiencing the greatest level of external interference from the interference source relative to neighboring sectors based on the particular sector satisfying a particular quantity of the one or more conditions. For example, the detection system 120 may determine that the particular sector is experiencing the greatest level of external interference from the interference source relative to neighboring sectors based on the particular sector satisfying at least three of the first through fourth conditions.

Figure 1F:
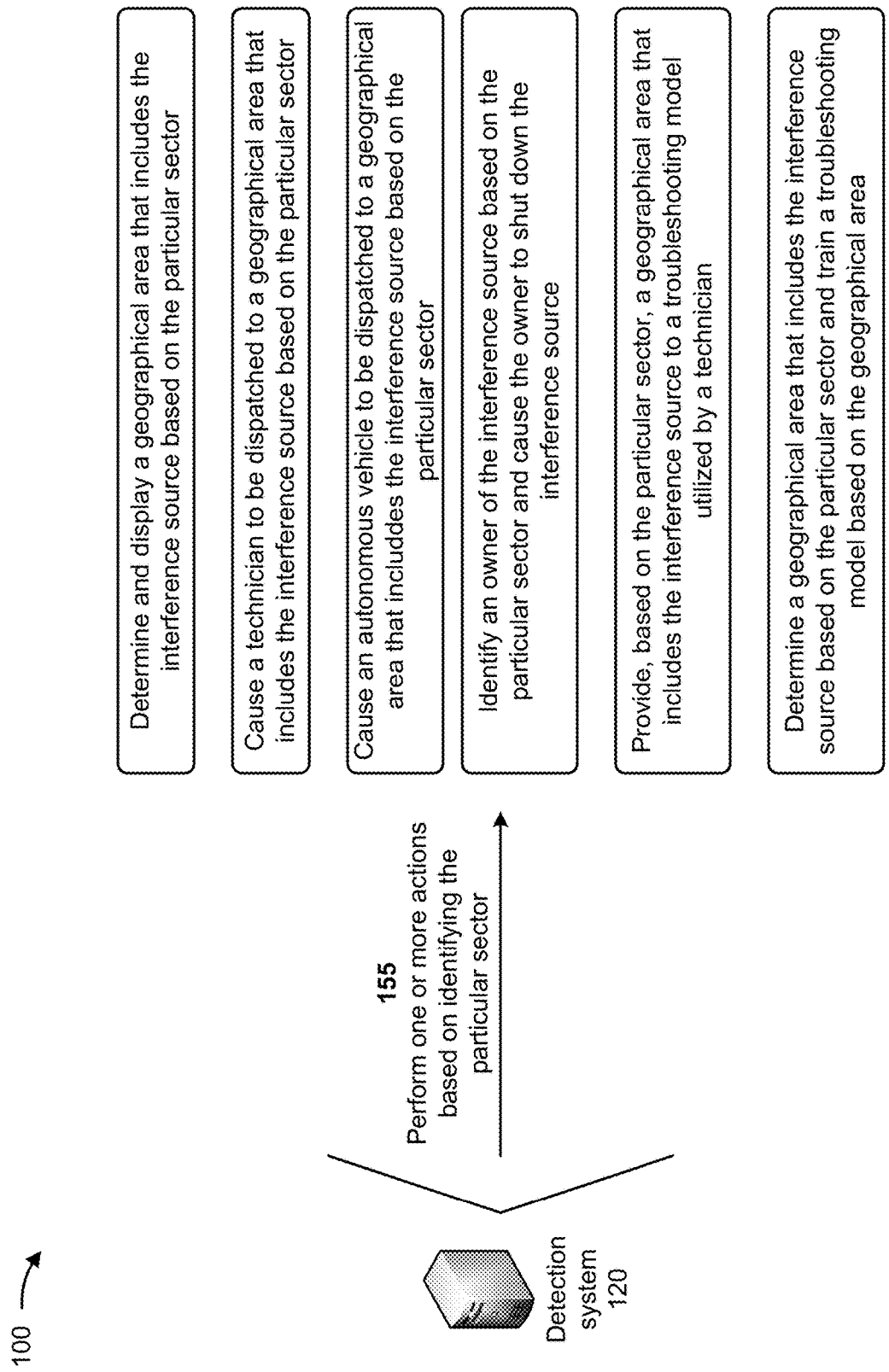

As shown in FIG. 1F, and by reference number 155, the detection system 120 may perform one or more actions based on identifying the particular sector. In some implementations, the one or more actions may include the detection system 120 performing one or more mitigation actions to mitigate an effect of the interference source. For example, the detection system 120 may perform one or more mitigation actions to mitigate the effect of the interference source during a period of time until the interference source can be removed. The one or more mitigation actions may include the detection system 120 automatically adjusting a position, a direction, transmitting and receiving beams, a logical parameter, a soft parameter, a physical parameter, and/or tilt of an antenna associated with the particular sector, the detection system 120 automatically shifting traffic to another channel, the detection system 120 reducing a gain of an antenna associated with the particular sector to cause UEs 105 to transmit with higher power, and/or the like.

In some implementations, the one or more actions include the detection system 120 determining and displaying a geographical area that includes a location of the interference source based on identifying the particular sector. The detection system 120 may determine the geographical area based on a sector coverage footprint associated with the particular sector, a direction in which an antenna associated with the particular sector is facing, and/or the like. This sector is the sector experiencing the highest interference when compared to its neighbor and co-located sectors. The detection system 120 may provide information associated with the particular sector and/or information identifying the geographical area to a user device to cause the user device to display the geographical area to a user (e.g., a technician). By providing the information to the user device, a field team (e.g., a user) will know the sector, geographical area, and PRB's that are experiencing external interference thereby enabling the field team to work faster and more accurately resolve a greater quantity of external interference issues.

In some implementations, the detection system 120 may provide information associated with the particular sector to an interference hunter tool. The interference hunter tool may utilize the information associated with the particular sector as an input to triangulate the signal. A geographical area that includes a location of the interference source may be determined based on triangulating the signal.

In some implementations, the one or more actions include the detection system 120 causing a technician and/or an autonomous vehicle to be dispatched to a geographical area that includes a location of the interference source based on the particular sector, that is the sector that (1) passed all the filters that removed all the interferences not caused by sources external to the network and (2) is experiencing the highest interference levels when compared to its neighbor and co-located sectors. For example, the detection system 120 may cause a technician and/or an autonomous vehicle to be dispatched to the geographical area to determine a location of the interference source by providing information identifying the geographical area to a device, e.g., a user device, associated with the technician and/or the autonomous vehicle. In some implementations, the detection system 120 may provide the information identifying the geographical area via a user interface, as described in greater detail below with respect to FIG. 1G. In this way, the detection system 120 may quickly and efficiently automatically dispatch a technician and/or an autonomous vehicle directly to a geographical area in which an interference source is located.

Figure 1G:
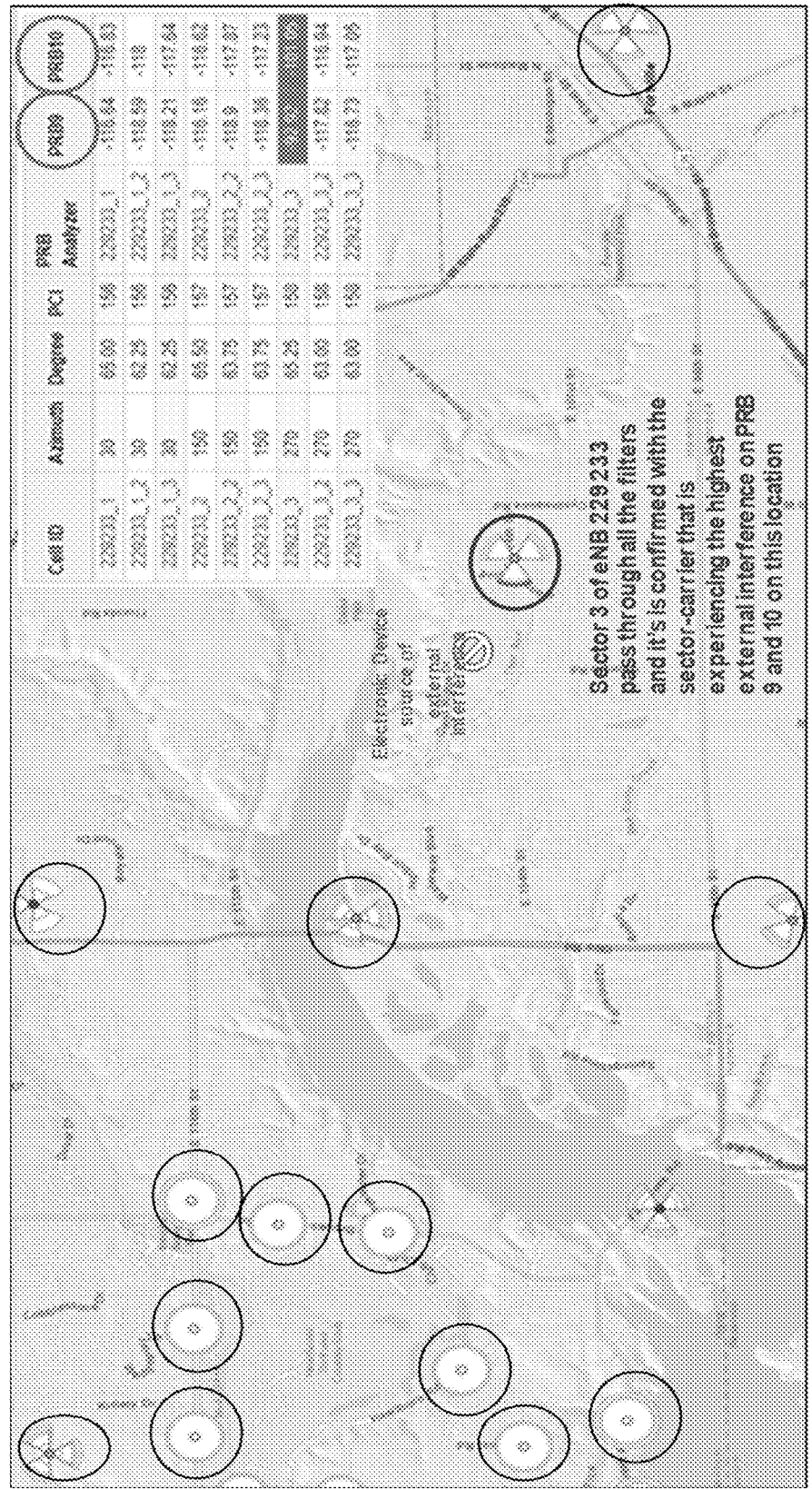

In some implementations, the one or more actions include the detection system 120 identifying an owner of the interference source based on the particular sector and causing the owner, or another party acting on behalf of the owner, to shut down the interference source. In some implementations, the one or more actions include the detection system 120 providing, based on the particular sector, a geographical area in which the interference source is located to a troubleshooting model utilized by a technician. The troubleshooting model may determine one or more actions (e.g., adjusting a position of an antenna, changing a transmit power of a base station 110, and/or the like) to mitigate interference experienced by the particular sector based on the geographical area and/or the interference data. In some implementations, the one or more actions include the detection system 120 determining, based on a sector coverage footprint associated with the particular sector, a geographical area in which the interference source is located and training a troubleshooting model based on the geographical area. FIG. 1G is a diagram of an example of interference source information that may be provided by the detection system 120 to a user (e.g., a technician) via a user interface. As shown in FIG. 1G, the interference source information may include a map of a geographical area associated with the interference source, information identifying the geographical location of an interference source, information identifying a sector experiencing the highest level of interference relative to other sectors, information associated with performing an interference analysis associated with the interference source, and information associated with comparison results generated by the detection system 120.

In this way, the detection system 120 detects a base station sector impacted by an external interference source. The detection system 120 may identify sectors of the base stations 110 that are experiencing external interference and may differentiate the external interference from other types of interference, such as passive intermodulation. Additionally, the detection system 120 may automatically isolate the most impacted sectors of the base stations 110 affected by the external interference by identifying a closest base station sector to the interference source. The detection system 120 increases a quantity of resolved cases, improves general network performance, and improves customer experience. Thus, the detection system 120 conserves computing resources, networking resources, transportation resources, and/or the like associated with driving around to locate the interference source, degraded base station 110 performance caused by the interference source, handling customer complaints associated with the degraded base station 110 performance, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
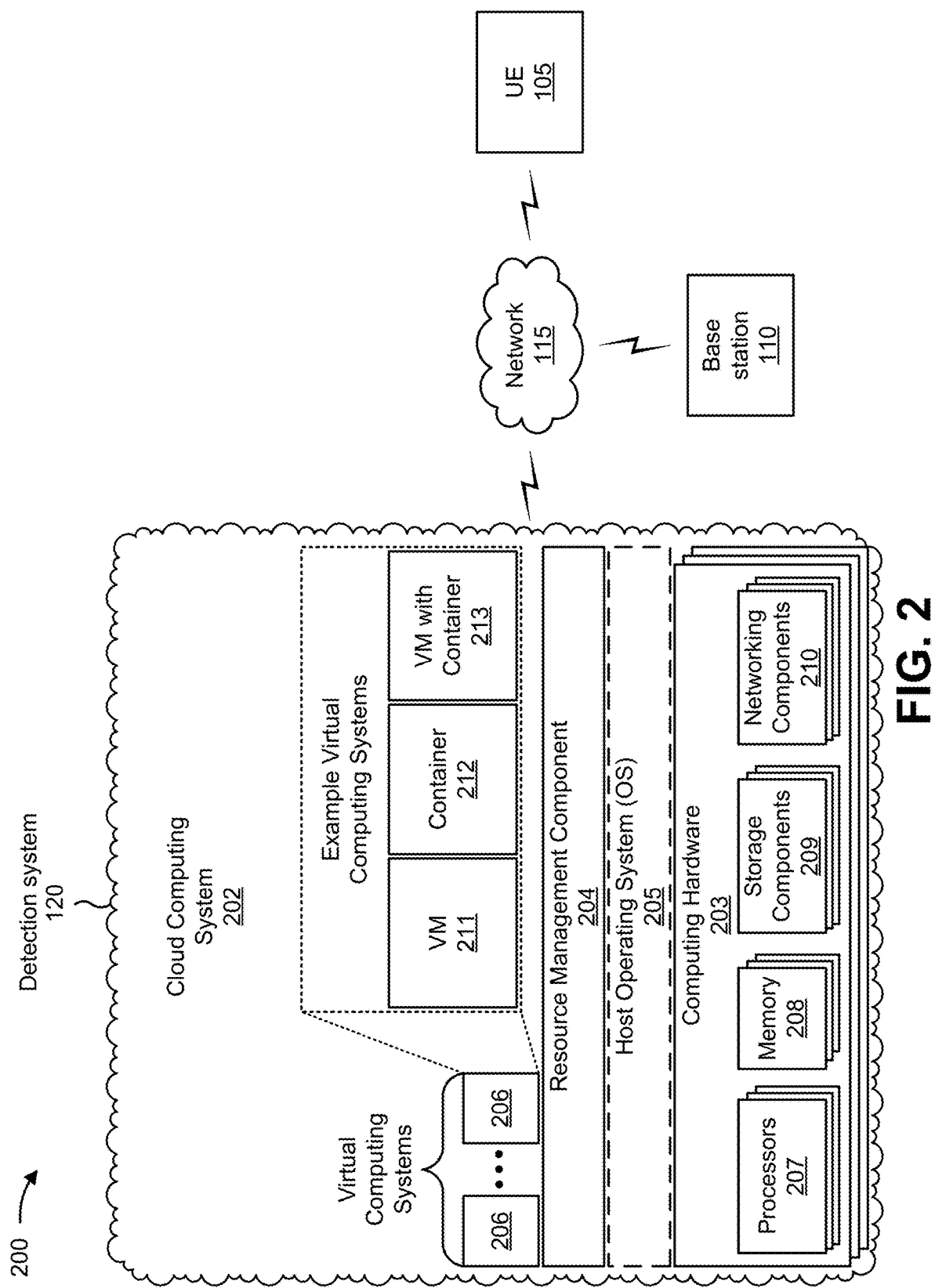
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include detection system 120, which may include one or more elements of and/or may execute within a cloud computing system 202. The cloud computing system 202 may include one or more elements 203-213, as described in more detail below. As further shown in FIG. 2, environment 200 may include UE 105, base station 110, and/or network 115. Devices and/or elements of environment 200 may interconnect via wired connections and/or wireless connections.

UE 105 includes one or more devices capable of receiving, generating, storing, processing, and/or providing information, as described elsewhere herein. UE 105 may include a communication device and/or a computing device. For example, UE 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

Base station 110 includes one or more devices capable of transferring traffic, such as audio, video, text, and/or other traffic, destined for and/or received from UE 105. For example, base station 110 may include an eNB associated with an LTE network that receives traffic from and/or sends traffic to a core network, a gNB associated with a RAN of a 5G network, a base transceiver station, a radio base station, a base station subsystem, a cellular site, a cellular tower, an access point, a transmit receive point (TRP), a radio access node, a macrocell base station, a microcell base station, a picocell base station, a femtocell base station, and/or another network entity capable of supporting wireless communication.

Network 115 may include a RAN that includes one or more base stations 110 that take the form of eNBs, gNBs, and/or the like, via which a user device (e.g., a mobile phone, a laptop computer, a tablet computer, a desktop computer, and/or the like) communicates with a core network. Network 115 may include one or more wired and/or wireless networks. For example, network 115 may include a cellular network (e.g., a 5G network, an LTE network, a 3G network, a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although detection system 120 may include one or more elements 203-213 of the cloud computing system 202, may execute within the cloud computing system 202, and/or may be hosted within the cloud computing system 202, in some implementations, detection system 120 may not be cloud-based (e.g., may be implemented outside of a cloud computing system) or may be partially cloud-based. For example, detection system 120 may include one or more devices that are not part of the cloud computing system 202, such as device 300 of FIG. 3, which may include a stand-alone server or another type of computing device. Detection system 120 may perform one or more operations and/or processes described in more detail elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
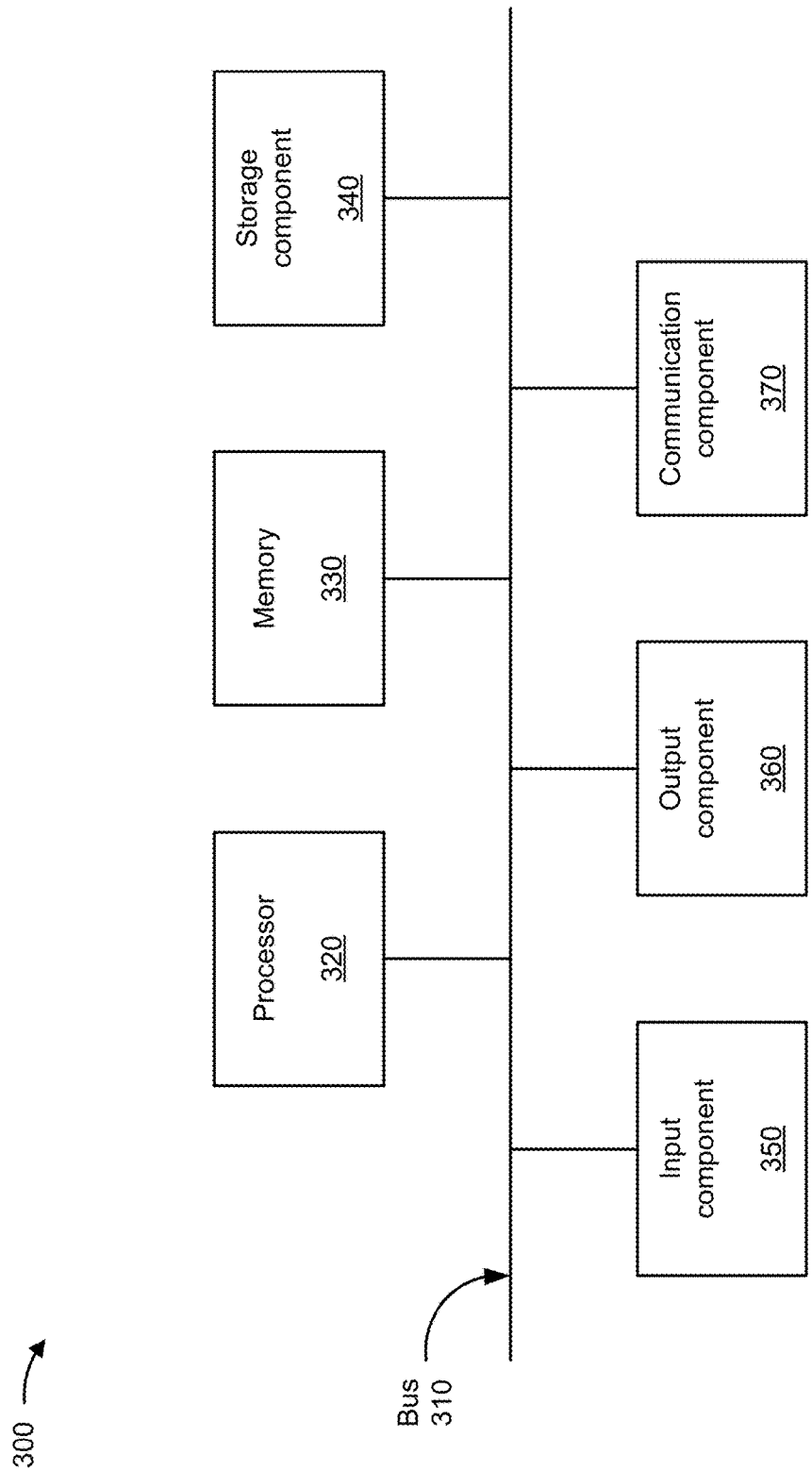
FIG. 3 is a diagram of example components of one or more devices of FIG. 2.

FIG. 3 is a diagram of example components of a device 300, which may correspond to UE 105, base station 110, and/or detection system 120. In some implementations, UE 105, base station 110, and/or detection system 120 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
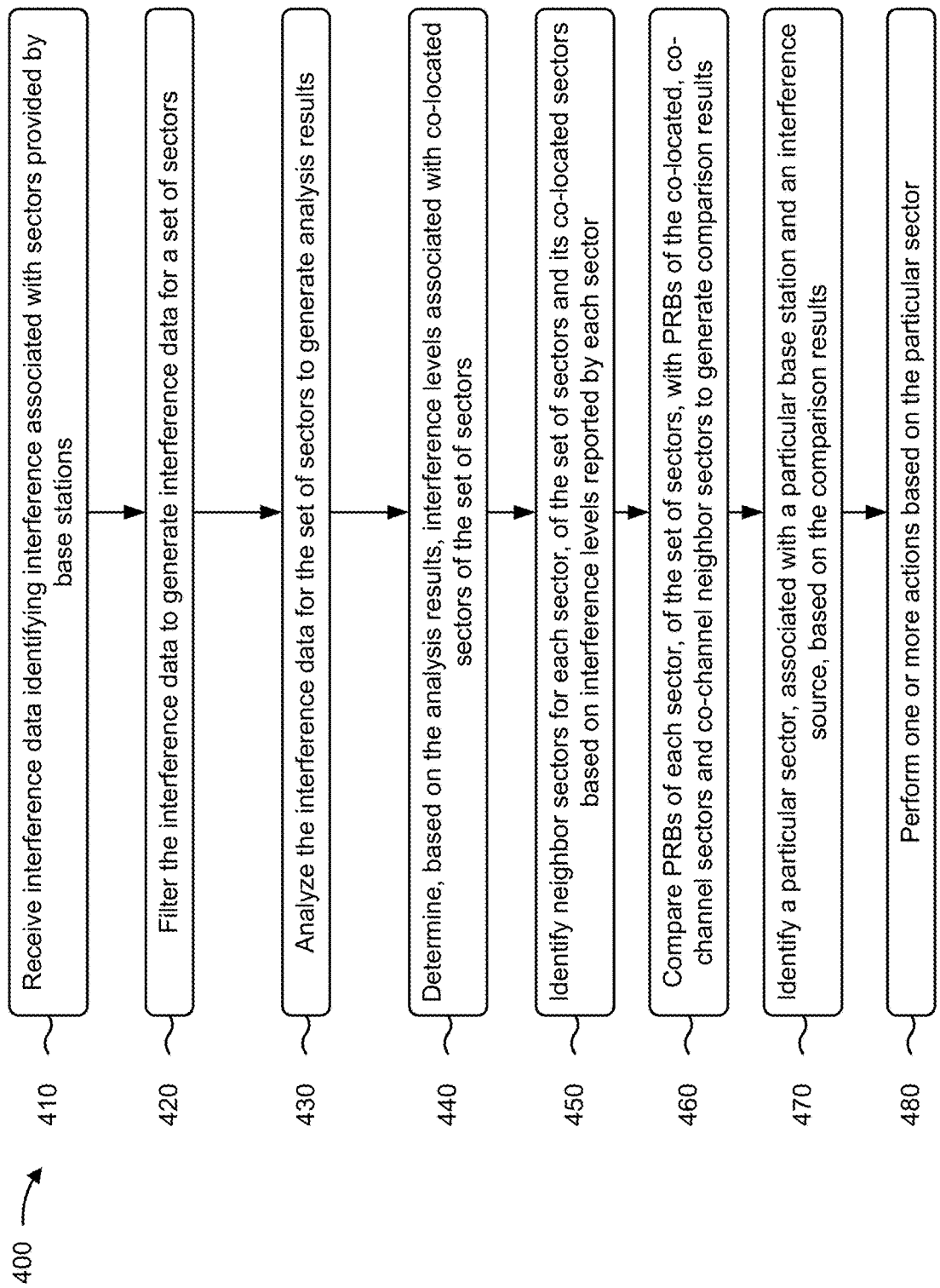
FIG. 4 is a flowchart of an example process relating to detecting an impacted base station sector by an external interference source.

FIG. 4 is a flowchart of an example process 400 associated with detecting an impacted base station sector by an external interference source. In some implementations, one or more process blocks of FIG. 4 may be performed by a device (e.g., detection system 120). In some implementations, one or more process blocks of FIG. 4 may be performed by another device or a group of devices separate from or including the device, such as a UE (e.g., UE 105) and/or a base station (e.g., base station 110). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving interference data identifying interference associated with sectors provided by base stations (block 410). The interference data may include receiving branch and sector PRB data, cell relation with handover attempts data, geographical data for locations of the base stations, and/or logical and physical configurations of the base stations.

As further shown in FIG. 4, process 400 may include filtering the interference data to generate interference data for a set of sectors (block 420). In some implementations, the device filters interference data associated with sectors with passive intermodulation issues and sectors with alarms, from the interference data, to generate the interference data for the set of sectors. The device may calculate a difference between the interference data received during first traffic conditions and the interference data received during second traffic conditions. The device may filter the interference data associated with the sectors with the passive intermodulation issues when the difference satisfies a threshold.

Alternatively, and/or additionally, the device may determine that the interference data associated with the sectors with the alarms satisfies an interference threshold. The device may filter the interference data associated with the sectors with the alarms based on determining that the interference data associated with the sectors may be generated by a faulty or defective sector-radio.

As further shown in FIG. 4, process 400 may include analyzing the interference data for the set of sectors to generate analysis results (block 430). In some implementations, the device may perform an interference analysis on PRBs and RF receiving branches, of the interference data for the set of sectors, to generate the analysis results. The device may calculate average interference levels for the PRBs of the interference data for the set of sectors. The device may determine first results, of the analysis results, indicating whether the average interference levels satisfy an interference threshold. The device may determine counts for the PRBs of the interference data for the set of sectors (e.g., how many time each PRB is exceeding an interference level threshold within a pre-defined period of time). The device may determine second results, of the analysis results, indicating whether the counts satisfy a count threshold.

In some implementations, the device may identify particular RF receiving branches of a sector, from the set of sectors, from the receiving branches of the same sector of the interference data for the set of sectors, not experiencing interference. The device may remove results associated with the particular receiving branches from the analysis results.

As further shown in FIG. 4, process 400 may include determining, based on the analysis results, interference associated with co-located sectors of the set of sectors (block 440). In some implementations, the device may determine that interference associated with the co-located sectors of the set of sectors satisfies an interference threshold. The device may determine the interference associated with the co-located sectors of the set of sectors satisfies the interference threshold.

As further shown in FIG. 4, process 400 may include identifying neighbor sectors for each sector, of the set of sectors, and its co-located sectors based on the interference levels reported by each sector (block 450). In some implementations, the device may determine distances, path loss, and handover attempts between the sectors and its neighbor sectors. The device may identify the neighbor sectors of the sectors based on the distances, path loss, and the handover attempts between the sectors and its neighbor sectors.

As further shown in FIG. 4, process 400 may include comparing PRBs for each sector, of the set of sectors, with PRBs of their respective co-located, co-channel sectors and co-channel neighbor sectors to generate comparison results (block 460).

As further shown in FIG. 4, process 400 may include identifying a particular sector, associated with a particular base station and an interference source, based on the comparison results (block 470). In some implementations, the device may identify the particular sector based on the particular sector experiencing a greatest level of external interference from the interference source relative to neighboring sectors of the particular sector.

As further shown in FIG. 4, process 400 may include performing one or more actions based on the particular sector (block 480). In some implementations, performing the one or more actions may include determining a geographical location of the interference source based on the particular sector and providing information identifying the geographical location for display. Alternatively, and/or additionally, performing the one or more actions may include causing a technician to be dispatched to a geographical location area of the interference source based on the particular sector coverage footprint and/or causing an autonomous vehicle to be dispatched to a geographical location area of the interference source based on the particular sector coverage footprint.

In some implementations, performing the one or more actions may include identifying an owner of the interference source based on the particular sector, causing the owner to shut down the interference source, providing, based on the particular sector, information identifying a geographical location of the interference source to a troubleshooting model utilized by a technician, and/or training the troubleshooting model based on the geographical location.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device, interference data identifying interference associated with sectors, wherein the interference data is provided by one or more base stations;
    filtering, by the device, a first portion of the interference data associated with sectors with passive intermodulation issues and a second portion of the interference data associated with sectors with alarms to generate interference data for a set of sectors;

performing, by the device, an interference analysis on physical resource blocks (PRBs) and RF receiving branches, of the interference data for the set of sectors, to generate analysis results;

identifying, by the device, neighbor sectors of the set of sectors;

comparing, by the device, PRBs of the set of sectors with PRBs of the neighbor sectors to generate comparison results;

identifying, by the device, a particular sector, associated with a particular base station and an external interference source, based on the comparison results;

determining, by the device, a geographical area that includes the interference source based on the particular sector; and performing, by the device, one or more actions based on at least one of the particular sector or the geographical area.

2. The method of claim 1, wherein the interference data includes one or more of:

receiving branch and sector PRB data, cell relation with handover attempts data, geographical data for locations of the base stations, propagation models, path loss data, or data associated with logical and physical configurations of the base stations.

3. The method of claim 1, wherein filtering the first portion of the interference data associated with the sectors with the passive intermodulation issues comprises:

calculating a difference between the interference data received during first traffic conditions and the interference data received during second traffic conditions; and filtering the interference data associated with the sectors with the passive intermodulation issues when the difference satisfies a threshold.

4. The method of claim 1, wherein filtering the second portion of the interference data associated with the sectors with the alarms comprises:

determining that the interference data associated with the sectors with the alarms satisfies one or more criteria; and filtering the interference data associated with the sectors with the alarms based on determining that the interference data associated with the sectors with the alarms satisfies the one or more criteria.

5. The method of claim 1, wherein performing the interference analysis on the PRBs and the RF receiving branches, of the interference data for the set of sectors, to generate the analysis results comprises:

calculating average interference levels for the PRBs of the interference data for the set of sectors;

determining first results, of the analysis results, indicating whether the average interference levels satisfy an interference threshold;

determining counts for the PRBs of the interference data for the set of sectors; and determining second results, of the analysis results, indicating whether the counts satisfy a count threshold.

6. The method of claim 1, wherein performing the interference analysis on the PRBs and the receiving branches, of the interference data for the set of sectors, to generate the analysis results comprises:

identifying particular receiving branches, from the receiving branches of the interference data for the set of sectors, not experiencing interference; and removing results associated with the particular receiving branches from the analysis results.

7. The method of claim 1, further comprising:

determining, based on the analysis results, interference associated with co-located sectors of the set of sectors based on determining that interference associated with the co-located sectors of the set of sectors satisfies an interference threshold.

8. A device, comprising:

one or more processors configured to:

receive interference data identifying interference associated with sectors provided by base stations;

filter interference data associated with sectors with passive intermodulation issues and sectors with alarms, from the interference data, to generate interference data for a set of sectors;

perform an interference analysis on physical resource blocks (PRBs) and receiving branches, of the interference data for the set of sectors, to generate analysis results, identify particular receiving branches, from the receiving branches of the interference data for the set of sectors, not experiencing interference;

removing results associated with the particular receiving branches from the analysis results;

determine, based on the analysis results, interference associated with co-located sectors of the set of sectors;

identify neighbor sectors of the sectors based on the interference;

compare PRBs of the co-located sectors with PRBs of the neighbor sectors to generate comparison results;

identify a particular sector, associated with a particular base station and an interference source, based on the comparison results; and perform one or more actions based on the particular sector.

9. The device of claim 8, wherein the one or more processors, when identifying the neighbor sectors of the sectors, are configured to:

determine distances, radio signal path loss, and handover attempts between the sectors, from the set of sectors, and their correspondent neighboring sectors; and identify the neighbor sectors of the sectors based on the distances, radio signal path loss, and the handover attempts between the co-located sectors.

10. The device of claim 8, wherein the particular sector experiences a greatest level of external interference from the interference source relative to other sectors.

11. The device of claim 8, wherein the one or more processors, when performing the one or more actions, are configured to:

determine a geographical area that includes the interference source based on the particular sector that is experiencing the greatest levels of interference; and provide information identifying the geographical area for display.

12. The device of claim 8, wherein the one or more processors, when performing the one or more actions, are configured to one or more of:
    cause a technician to be dispatched to a geographical area of the interference source based on the particular sector; or
    cause an autonomous vehicle to be dispatched to a geographical area of the interference source based on the particular sector.

13. The device of claim 8, wherein the one or more processors, when performing the one or more actions, are configured to one or more of:
    reduce a gain associated with an antenna associated with the particular sector;
    performing a self-optimization procedure to mitigate an effect of the interference on the particular sector; or
    adjust a parameter of an antenna associated with the particular sector.

14. The device of claim 8, wherein the one or more processors, when performing the one or more actions, are configured to one or more of:
    provide, based on the particular sector, information identifying a geographical area that includes the interference source to a troubleshooting model utilized by a technician; or
    train the troubleshooting model based on the geographical area.

15. A non-transitory computer-readable medium storing a set of instructions, the set of instructions comprising:
    one or more instructions that, when executed by one or more processors of a device, cause the device to:
        receive interference data identifying interference associated with sectors provided by base stations;
        filter interference data associated with sectors with passive intermodulation issues and sectors with alarms, from the interference data, to generate interference data for a set of sectors;
        perform an interference analysis on physical resource blocks (PRBs) and receiving branches, of the interference data for the set of sectors, to generate analysis results;
        determine, based on the analysis results, interference associated with co-located sectors of the set of sectors;
        identify neighbor sectors of the co-located sectors based on the interference;
        compare PRBs of the sectors with PRBs of the neighbor sectors to generate comparison results;
        identify a particular sector, associated with a particular base station and an interference source, based on the comparison results,
            wherein the particular sector experiences a greatest level of external interference from the interference source relative to neighboring sectors of the particular sector; and
        perform one or more actions based on the particular sector.

16. The non-transitory computer-readable medium of claim 15, wherein the one or more instructions, that cause the device to filter the interference data associated with the sectors with the passive intermodulation issues, cause the device to:
    calculate a difference between the interference data received during first traffic conditions and the interference data received during second traffic conditions; and
    filter the interference data associated with the sectors with the passive intermodulation issues when the difference satisfies a threshold.

17. The non-transitory computer-readable medium of claim 15, wherein the one or more instructions, that cause the device to filter the interference data associated with the sectors with the alarms, cause the device to:
    determine whether the interference data associated with the sectors with the alarms activated by the sectors' radio with physical or soft issues; and
    filter the interference data associated with the sectors with the alarms based on determining that the interference data associated with the sectors with the alarms activated by the sectors' radio with physical or soft issues.

18. The non-transitory computer-readable medium of claim 15, wherein the one or more instructions, that cause the device to perform the interference analysis on the PRBs and the receiving branches, of the interference data for the set of sectors, to generate the analysis results, cause the device to:
    calculate average interference levels for the PRBs of the interference data for the set of sectors;
    determine first results, of the analysis results, indicating whether the average interference levels satisfy an interference threshold;
    determine counts for the PRBs of the interference data for the set of sectors; and
    determine second results, of the analysis results, indicating whether the counts satisfy a count threshold.

19. The non-transitory computer-readable medium of claim 15, wherein the one or more instructions, that cause the device to perform the interference analysis on the PRBs and the receiving branches, of the interference data for the set of sectors, to generate the analysis results, cause the device to:
    identify particular receiving branches, from the receiving branches of the interference data for the set of sectors, not experiencing interference; and
    remove results associated with the particular receiving branches from the analysis results.

20. The non-transitory computer-readable medium of claim 15, wherein the one or more instructions, that cause the device to determine, based on the analysis results, the interference associated with the co-located sectors of the set of sectors, cause the device to:
    determine whether interference associated with the co-located sectors of the set of sectors satisfies an interference threshold; and
    determine the interference based on determining that the interference associated with the co-located sectors of the set of sectors satisfies the interference threshold.

\* \* \* \* \*